(12) United States Patent
Katoh et al.

(10) Patent No.: US 7,519,666 B2
(45) Date of Patent: Apr. 14, 2009

(54) DATA TRANSMISSION AND RECEPTION SYSTEM WITH ACCURATE TIME INFORMATION

(75) Inventors: Yohichi Katoh, Yokohama (JP); Yohichiro Sumito, Funabashi (JP)

(73) Assignee: International Business Machines Corporation, Armonk, NY (US)

( * ) Notice: Subject to any disclaimer, the term of this patent is extended or adjusted under 35 U.S.C. 154(b) by 764 days.

(21) Appl. No.: 09/971,313

(22) Filed: Oct. 3, 2001

(65) Prior Publication Data

US 2002/0087719 A1 Jul. 4, 2002

(30) Foreign Application Priority Data

Oct. 5, 2000 (JP) .............................. 2000-306683

(51) Int. Cl.
*G06F 15/16* (2006.01)
*H04L 9/00* (2006.01)
(52) U.S. Cl. .................... 709/206; 709/237; 713/178
(58) Field of Classification Search ............ None
See application file for complete search history.

(56) References Cited

U.S. PATENT DOCUMENTS

| | | | | |
|---|---|---|---|---|
| 5,699,528 | A * | 12/1997 | Hogan | 705/40 |
| 6,067,561 | A * | 5/2000 | Dillon | 709/206 |
| 6,327,656 | B2 * | 12/2001 | Zabetian | 713/176 |
| 6,356,633 | B1 * | 3/2002 | Armstrong | 379/265.11 |
| 6,393,566 | B1 * | 5/2002 | Levine | 713/178 |
| 6,760,752 | B1 * | 7/2004 | Liu et al. | 709/206 |
| 7,174,362 | B1 * | 2/2007 | Lee | 709/203 |

FOREIGN PATENT DOCUMENTS

| | | |
|---|---|---|
| JP | PUPA 11-143361 | 5/1999 |
| JP | PUPA 11-261549 | 9/1999 |
| WO | WO 00/79348 A2 | 12/2000 |
| WO | WO 00/79348 A3 | 12/2000 |

OTHER PUBLICATIONS

Hsieh, Ming-I and Wu, Hsia o-kuang; "Secure Electronic Post Office," Oct. 2000, IEEE, pp. 251-256.*
"A Consideration on Certification Systems for Delivery and Contents in Electronic Mail" IEICE Technical Report, vol. 93, No. 139, pp. 1-6, (English abstract) Jul. 13, 1993.

* cited by examiner

*Primary Examiner*—Patrice Winder
*Assistant Examiner*—Azizul Choudhury
(74) *Attorney, Agent, or Firm*—John Pivnichny; Greenblum & Bernstein P.L.C.

(57) ABSTRACT

A data transmission and reception system for exchanging data such as e-mail by using accurate time information over a network. An authorizing office authorizes an authorization mail server to issue electronic postmarks including highly accurate time information. Then, the authorization mail server stamps an electronic postmark with the highly accurate time information embedded in it on e-mail being sent by a sender. Here, the electronic postmark data, to which the time information has been attached in the authorization mail server, is made tamperproof by a predetermined electronic postmark issue program and further encrypted to be transferred to a receiver mail server.

6 Claims, 8 Drawing Sheets

DATA TRANSMISSION AND RECEPTION SYSTEM WITH ACCURATE TIME INFORMATION

FIELD OF THE INVENTION

The present invention relates to a data transmission and reception system for exchanging data, such as e-mail, along with accurate time information over a network.

BACKGROUND

Electronic mail (e-mail) is used with increasing frequency as the Internet becomes more widespread. Conventionally, in transmission and reception of e-mail, an e-mail message is sent out with time information that is attached in a sender's PC (Personal Computer). Then, a receiver's PC receives the e-mail via the Internet and displays the e-mail message on a PC screen. Here, generally, the time information attached to the e-mail in the sender's PC is displayed at the receiver's PC as the sending time for the e-mail message.

As another example, one can register to win a prize or fill out a questionnaire on a website that is made public on the Internet. In the case of registration to win a prize, a registrant enters predetermined data such as his name and address in a registration form presented by a server of the prize provider and transmits the data on the registrant's PC. When the transmitted data reaches the server of the prize provider via the Internet, the server checks the registration (for example, whether it meets predetermined registration conditions or not) and then accepts the registration.

In this case, unlike the case of transmission and reception of e-mail, it is generally agreed that the time when the server accepts the registration is "registration time." However, this approach is problematic, for the following reasons.

An Internet user's PC has an internal clock. Based on the time information provided by the clock, time information to indicate the sending time is attached to e-mail. However, the internal clock is not necessarily highly accurate. Similarly, a server and mail server of each service provider also have internal clocks, but the clocks are not guaranteed to be accurate. Thus, the accuracy of the time information attached to e-mail in transmission and reception is questionable.

As a result, there is a problem when the sending time is critical, especially in business, when contracts must be accurately time stamped. This also applies to registration to win a prize and answering a questionnaire. Particularly, there is inconvenience often when the "registration time" is critical, e.g., when a deadline is set for registrations or when registrations are accepted on a first-come-first-served basis. In this case, a registration may not meet the registration deadline due to the misaligned time setting of the time information maintained in the server although the registration was actually received before the deadline.

Further, since the server accepts registrations from registrants after checking the registration data, the data checking process may overload the server when a large number of registrations arrive simultaneously. This may lead to slow processing and ultimately to server overflow. Then, many of the registrations may not meet the deadline because the server regards their "registration time" as the point when it accepted the registrations as mentioned above.

Thus, there is a need for a way of providing accurate time information when exchanging data such as e-mail on a network.

SUMMARY

According to the present invention, a data transmission and reception system is characterized in that a sender server authorized by a predetermined organization to issue time information having a certain accuracy issues the time information and attaches such time information to data being transmitted. Preferably, the time information includes the time at which the sender server sends out the data.

In this manner, since the sender server authorized by the predetermined organization can issue the time information having a certain accuracy, a receiver server can obtain the highly accurate sending time for data. This is achieved by attaching the time information as the sending time from the sender server to data being transmitted. This means that a function that is analogous to a postmark used in actual mail services in post offices but that is electronic with certain accuracy can be provided on a network.

Further, if the sender server encrypts at least the time information before sending data with the time information, the sender server can protect the time information against external tampering. In this case, it is preferable to use a public key cryptosystem, in which a private key is used for data encryption in the sender server, and a public key is used for decryption in the receiver server. Thus, once the receiver server succeeds in decrypting the data, the time information attached to the data is proved to be the one issued in the sender server authorized by the predetermined organization, and the accuracy of the time information can be regarded as being reliable.

The sender server can be also monitored for the accuracy of the time information issued in the sender server by being connected to an organization server of the predetermined organization. Thus, monitoring the accuracy of the time information issued in the sender server by a third party in what is called an online manner can ensure that the predetermined accuracy is maintained.

On the other hand, the receiver server can sort the received data based on the time information attached to the data. More specifically, it obtains the time information attached to the data as the sending time for the data and determines, based on the sending time, whether the data has been sent before a predetermined time limit or not, for example. Instead, the data can also be sorted in the order of their arrival.

Further, a data transmission method according to the present invention can be thought of as a method characterized by issuing a time stamp having a certain accuracy based on externally obtained time information, attaching the issued time stamp to data received from a user's terminal, and sending out the data with the time stamp to a network.

Here, issue and attachment of the time stamp based on a program licensed by an authorizing organization allows even the operation involved in the attachment of the time stamp to be guaranteed. As a result, the time stamp can be protected against tampering.

This data transmission method can be applied to servers and mail servers of Internet providers capable of receiving data only from terminals of registered users.

The present invention can be also thought of as a data transmission and reception system in which a sender server attaches, to data being sent from a sender, time information about the time when the data is sent out to a network with a predetermined accuracy authorized in advance, and a receiver server regards the time indicated by the time information attached to the received data as an accepting time for the data in the receiver server. That is, the accepting time for data such as e-mail in the receiver server is attached in the sender server, rather than in the receiver server or a receiver concerned. The receiver server can then obtain the accurate time as the accepting time, since the sender server attaches the time information that has an authorized level of accuracy.

An e-mail distribution system in the present invention is characterized in that a sender system that sends e-mail data includes: time information maintaining means proved to be able to maintain time information having a certain accuracy by a third party or others; time stamp attaching means for attaching a time stamp including the time information having a certain accuracy to the e-mail data; and data transmission means for sending the e-mail data with the time stamp toward a receiver system.

Here, what is known as a radio wave clock is suitable for obtaining the time information having a certain accuracy. The radio wave clock receives radio waves including time information having a certain accuracy to obtain the time information from the radio waves.

Further, the time stamp may include information other than the time information, for example the name and address of the sender system. In addition, the time stamp can be made to appear at a predetermined position on a displayed or printed e-mail message.

Further, if the sender system or the sender's terminal is informed of the time information included in the time stamp after the sender system sends e-mail data, the sender can know the sending time for the e-mail data. In addition, if the receiver system informs the sender system that the receiver system has received the e-mail data with the time stamp, the sender system can recognize the reception of the e-mail by the receiver system.

BRIEF DESCRIPTIONS OF THE DRAWINGS

DETAILED DESCRIPTION

Now, a detailed description of the invention will be given below with reference to an embodiment shown in the appended drawings.

Figure 1:
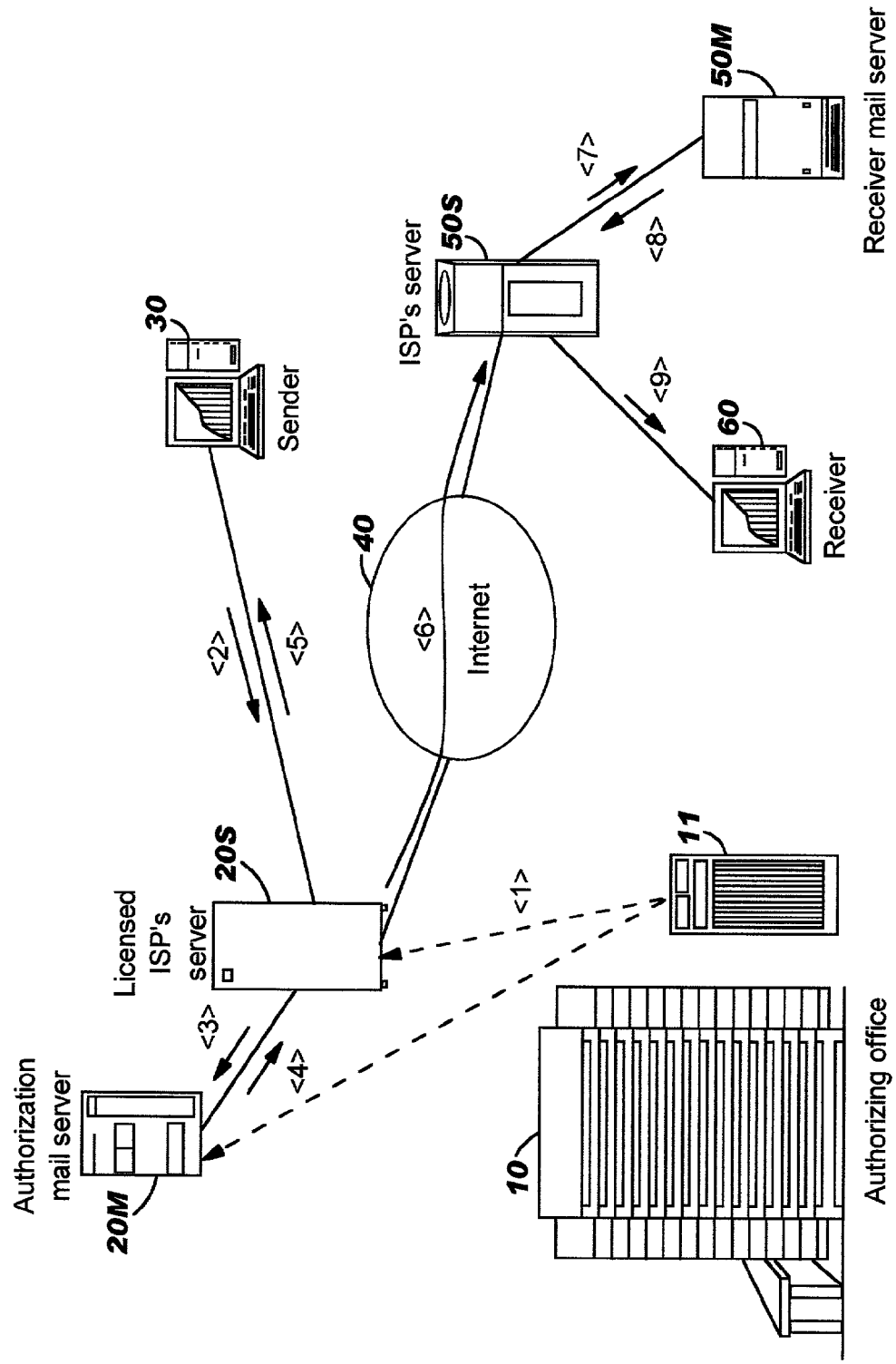
FIG. 1 shows a schematic configuration of an e-mail transmission and reception system in an exemplary embodiment.

FIG. 1 is a schematic view for explaining a configuration of an e-mail transmission and reception system (a data transmission and reception system) in this embodiment.

The outline of the e-mail transmission and reception system in this embodiment is as follows. An authorization mail server (a sender server or a sender system) 20M, which is authorized by an authorizing office (a predetermined public organization, a third party, or an authorizing organization) 10 to issue accurate time information, stamps (attaches) an electronic postmark (a time stamp) including the accurate time information on e-mail being sent from a sender's PC (a sender's terminal or a user's terminal) 30 and sends out the e-mail. The e-mail is transferred to a receiver mail server (a receiver server, a receiver system, or a data reception system) 50M over the Internet (a network) 40 and is finally delivered to a receiver's PC (a receiver's terminal) 60.

Figure 2:
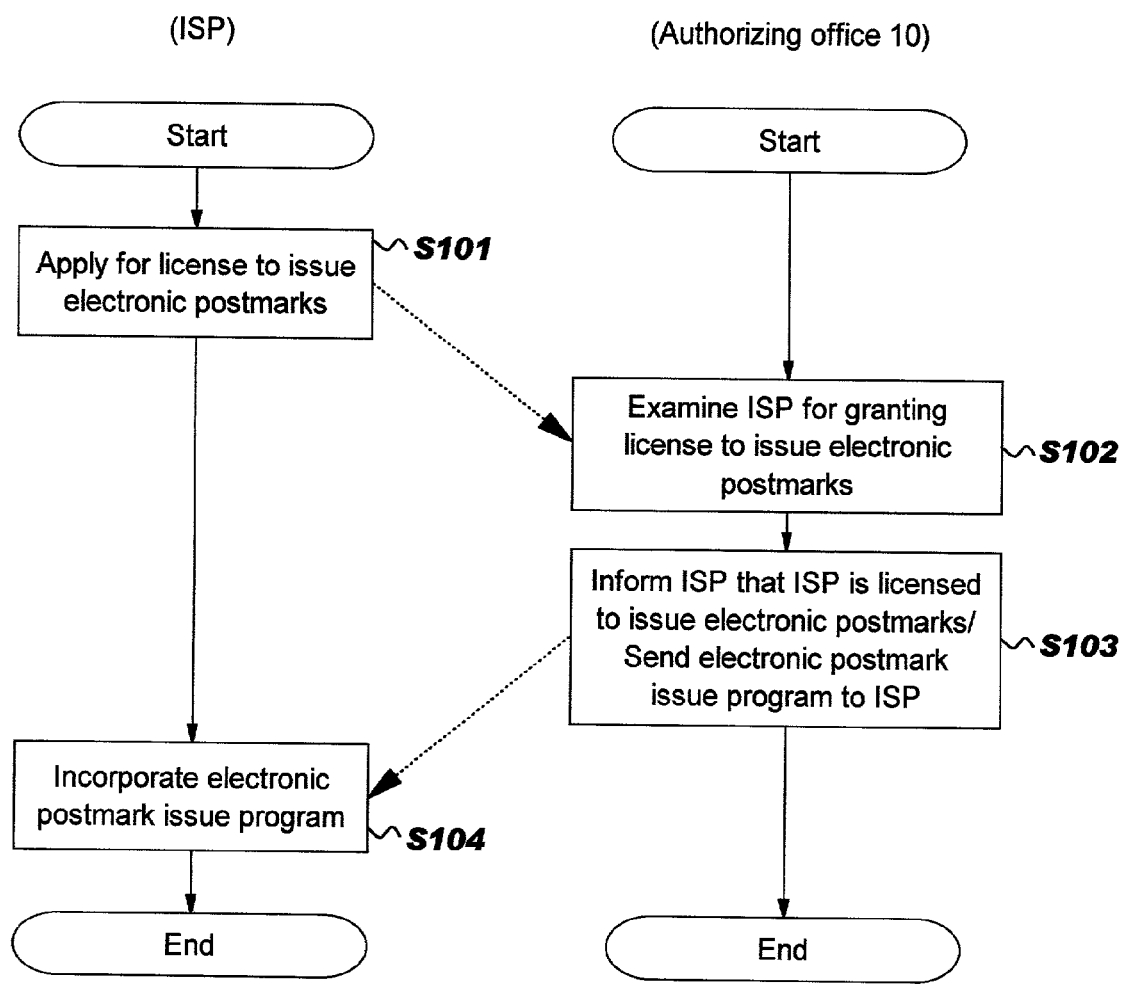
FIG. 2 is a flow chart showing processes in which an authorizing office authorizes an authorization mail server.

Prior to the implementation of this system configuration, the authorization mail server 20M should be authorized by the authorizing office 10 (<1> in FIG. 1). FIG. 2 is a schematic flow chart showing the authorization processes, in which an ISP (Internet Service Provider) that owns the mail server (unauthorized yet at this point) first applies to the authorizing office 10 for a license to issue the electronic postmarks (step S101).

Then, the authorizing office 10 makes a predetermined examination of the ISP. That is, it examines the ISP's mail server for the ability to issue the electronic postmarks including the accurate time information (step S102). If the ISP passes the examination, the authorizing organization 10 informs the ISP that the ISP is licensed to issue electronic postmarks and sends to the ISP an electronic postmark issue program for issuing electronic postmarks in the ISP's mail server (step S103).

In response, the ISP incorporates the received electronic postmark issue program into the mail server (step S104). Thus, the mail server functions as the authorization mail server 20M authorized by the authorizing office 10 thereafter, and the ISP that owns the mail server 20M becomes a licensed ISP that is licensed by the authorizing office 10.

The above-described procedure concerning the grant of a license may be what is called an off-line procedure involving exchange of documents. However, in this embodiment, it is intended to be an on-line procedure between the authorizing office 10 and the ISP (the authorization ISP) via a telephone network or the Internet 40.

As shown in FIG. 1, the authorizing office 10 has an authorizing office server (an organization server) 11 to carry out the above-described procedure concerning the granting of the license and to manage (monitor) the authorization mail server 20M authorized by the authorizing office 10. The authorizing office server 11 can connect to the authorization mail server 20M via a dedicated line or the Internet 40.

Figure 3:
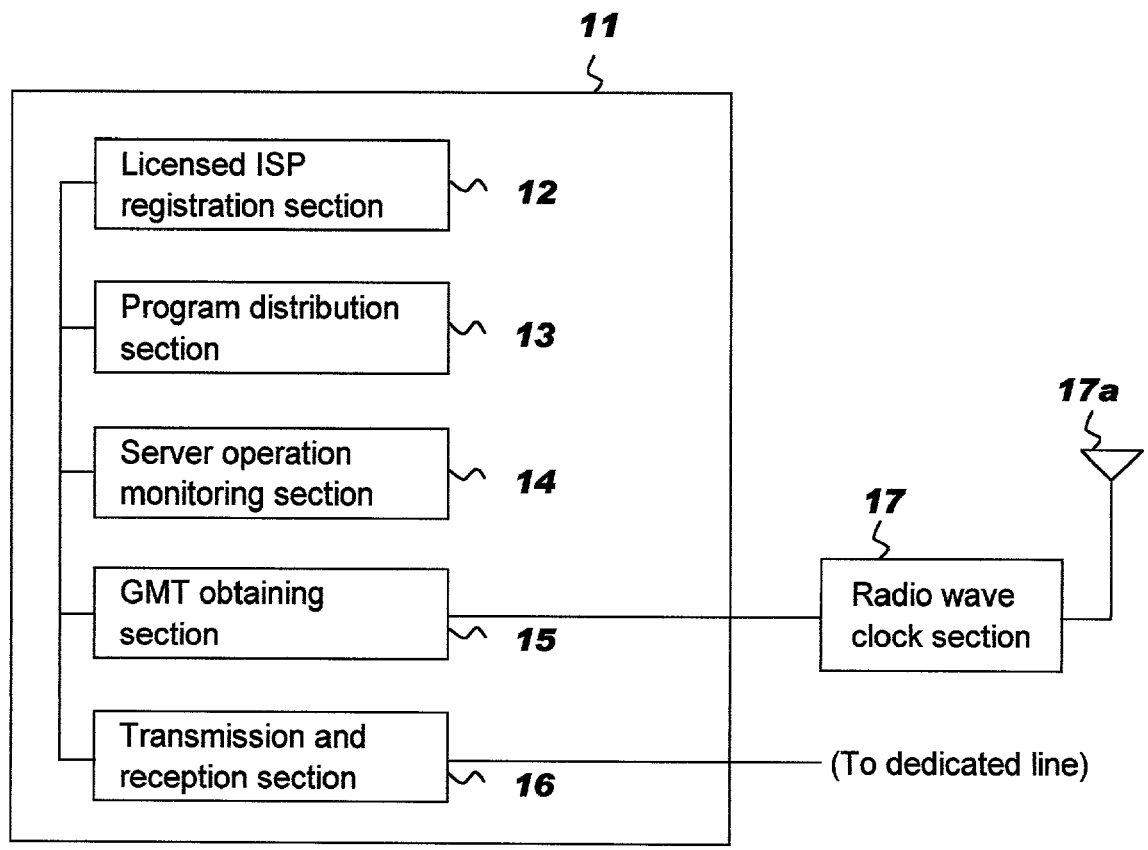
FIG. 3 shows a configuration of an authorizing office server.

As shown in FIG. 3, which depicts a configuration for performing the above-described procedure on-line, the authorizing office server 11 comprises: a licensed ISP registration section 12 for receiving the registration application from the ISP and for registering (storing) information, such as its serial number and location, as management information about the authorization mail server 20M authorized as a result of the examination; and a program distribution section 13 for distributing on-line the electronic postmark issue program to the authorized mail server.

The authorizing office server 11 also comprises, as a configuration for managing the authorization mail server 20M after being authorized: a server operation monitoring section 14 for monitoring the operating status of the authorization mail server 20M registered in the licensed ISP registration section 12; a GMT obtaining section 15 for obtaining GMT (Greenwich Mean Time) as the accurate time information; and a transmission and reception section 16 for data communication with the authorization mail server 20M via the dedicated line (or the Internet, etc.).

The server operation monitoring section 14 appropriately monitors the authorization mail server 20M, as described below, to determine whether it maintains accurate time or not.

To the GMT obtaining section 15 is connected a radio wave clock section 17, which is installed internally or externally to the authorizing office server 11. The radio wave clock section 17 receives the 40 kHz carrier wave sent as the standard-frequency and time-signal emissions from the radio wave clock broadcast station operated by Communications Research Laboratory of the Japanese Ministry of Posts and Telecommunications, or of an equivalent laboratory, with an antenna 17a. The radio wave clock section 17 obtains GMT and outputs it to the GMT obtaining section 15 as the highly accurate time information, based on the time data included in the carrier wave.

The authorizing office server 11 maintains GMT obtained in the GMT obtaining section 15 as reference time information in the e-mail distribution system.

Figure 4:
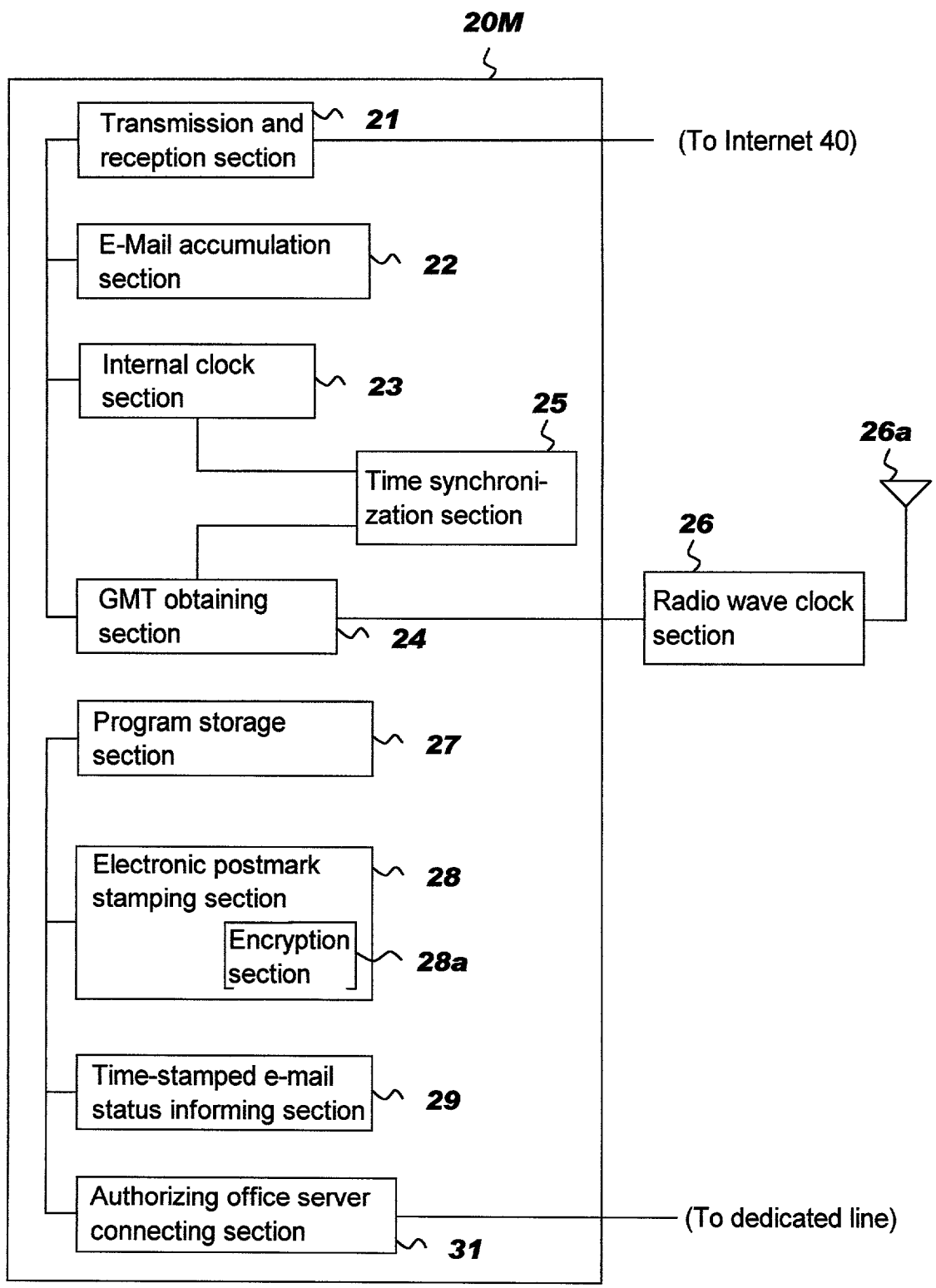
FIG. 4 shows a configuration of the authorization mail server.

As shown in FIG. 1, the authorization mail server 20M is connected to the Internet 40 via the licensed ISP's server 20S. As shown in FIG. 4, similar to common mail servers, the authorization mail server 20M comprises: a transmission and reception section (data transmitting means) 21 for external data communication; and an e-mail accumulation section 22 for accumulating e-mail being transmitted or received.

The authorization mail server 20M also comprises: an internal clock section (timer and time stamp attaching means) 23 installed internally to the authorization mail server 20M itself to incorporate the time information in the electronic postmark; a GMT obtaining section 24 for obtaining GMT as the highly accurate time information in the authorization mail server 20M; and a time synchronization section (time information delivering means) 25 for synchronizing the time maintained in the internal clock section 23 with GMT obtained in the GMT obtaining section 24.

To the GMT obtaining section 24 is connected a radio wave clock section (time information receiving and obtaining means) 26, which is installed internally or externally to the authorization mail server 20M. As with the radio wave clock section 17, the radio wave clock section 26 receives the carrier wave (40 kHz) sent as the standard-frequency and time-signal emissions from the radio wave clock broadcast station operated by Communications Research Laboratory of the Japanese Ministry of Posts and Telecommunications, or other equivalent laboratory, with an antenna 26a, and thereby obtains GMT as the highly accurate time information and outputs it to the GMT obtaining section 24.

When the GMT obtaining section 24 receives GMT from the radio wave clock section 26 as the highly accurate time information, it delivers the time information to the time synchronizing section 25. The time synchronizing section 25 synchronizes the time maintained in the internal clock section 23 with GMT delivered from the GMT obtaining section 24. Here, the time synchronization can be achieved by applying a conventional time synchronization technique. This synchronization in the time synchronizing section 25 between GMT obtained in the GMT obtaining section 24 and the time maintained in the internal clock section 23 may be executed every fraction of time, for example every second, but it may be executed in appropriate intervals, such as every hour, daily, or weekly, depending on the accuracy of time required by the authorization mail server 20M concerned and the accuracy of time guaranteed by the internal clock section 23, and so on.

In this manner, the authorization mail server 20M is configured such that it can maintain the highly accurate time information, GMT, in the internal clock section 23 by obtaining the time information sent from the radio wave clock broadcasting station, which is an external source.

As a configuration for stamping (attaching) an electronic postmark with the highly accurate time information embedded in it on e-mail to be sent out from the authorization mail server 20M, the authorization mail server 20M also comprises: a program storage section 27 for storing the electronic postmark issue program provided by the authorizing office 10; an electronic postmark stamping section (time stamp attaching means) 28; and a time-stamped e-mail status informing section 29.

The electronic postmark stamping section 28 generates the electronic postmarks including predetermined information based on the electronic postmark issue program stored in the program storage section 27.

The electronic postmark information includes "GMT" as the highly accurate time information provided by the internal clock section 23. It can also incorporate local time of the licensed ISP ("JST" (Japan standard Time) for this embodiment, if the licensed ISP is installed in Japan) obtained with reference to "GMT." These "GMT" and "JST" may be expressed in terms of seconds, for example YYYY (year) MM (month) DD (day) mm (minute) ss (second), or in smaller units. Other information incorporated in the electronic postmark may include the name of the licensed ISP that stamps the electronic postmark, the location of the authorization mail server 20M, the IP (Internet Protocol) address of the authorization mail server 20M, and so on. Further, the electronic postmark information may incorporate rendering data for rendering the electronic postmark on a screen that displays the e-mail message or on a paper on which the e-mail message is printed.

The electronic postmark stamping section 28 attaches (stamps) the generated electronic postmark on the e-mail to be sent out from the authorization mail server 20M. This is achieved by embedding the electronic postmark data into the e-mail data with a predetermined timing immediately before the authorization mail server 20M sends out the e-mail. Accordingly, the time information included in the electronic postmark can be regarded as representing the time immediately before the e-mail is sent, i.e., the sending time for the e-mail.

To protect the electronic postmark data against external tampering, the electronic postmark stamping section 28 also makes the electronic postmark data tamperproof before embedding it into the data that constitutes the e-mail. To accomplish this, the electronic postmark stamping section 28 also comprises an encryption section 28a for encrypting the electronic postmark data stamped on the e-mail or the entire e-mail data on which the electronic postmark has been stamped.

Here, an encryption technique known as a Public-key Cryptosystem is preferably used. In the Public-key Cryptosystem, encryption and decryption are performed with a public key that is made public (e.g., on the Internet), and a private key that only a person in concern can know. Specifically, a person who manages the keys provides either one of the public key and the private key that have been previously associated with each other to a sender of the data, and provides the other key to a receiver of the data.

In this embodiment, it is preferable that the encryption section 28a of the authorization mail server 20M, which is the sender mail server for the e-mail, encrypts the data with the private key that only the authorized authorization mail server 20M can know, and the receiver mail server 50M, the number of which can be any, decrypts the data with the public key. This is preferable from the viewpoint that the electronic postmarks are stamped on e-mail in the proper authorization mail server 20M, that is, the authorization mail server 20M guarantees the validity of the electronic postmarks (in other words, from the viewpoint of protection against tampering).

Further, when the electronic postmark stamping section 28 stamps the electronic postmark on the e-mail, the time-stamped e-mail status informing section 29 informs the e-mail sender's PC 30 of the time information (GMT) embedded in the electronic postmark, i.e., the time at which the electronic postmark was stamped on the e-mail, via the transmission and reception section 21.

The authorization mail server 20M is further provided with an authorizing office server connection section 31. The authorizing office server connection section 31 is connected to the authorizing office server 11 via a dedicated line or the Internet 40 to inform it about the operating status of the authorization mail server 20M (e.g., the accuracy of the time information maintained), the issue history information of the electronic postmarks, and other information, as requested by the server operation monitoring section 14. In this manner, the authorization mail server 20M is monitored on-line by the authorizing office server 11.

As shown in FIG. 1, the receiver mail server 50M, which is to receive the e-mail with the electronic postmark stamped on it by the above described authorization mail server 20M, is connected to the Internet 40 via a receiver ISP server 50S. Here, the receiver mail server 50M may not be authorized like the authorization mail server 20M, nor does it have to be authorized.

Figure 5:
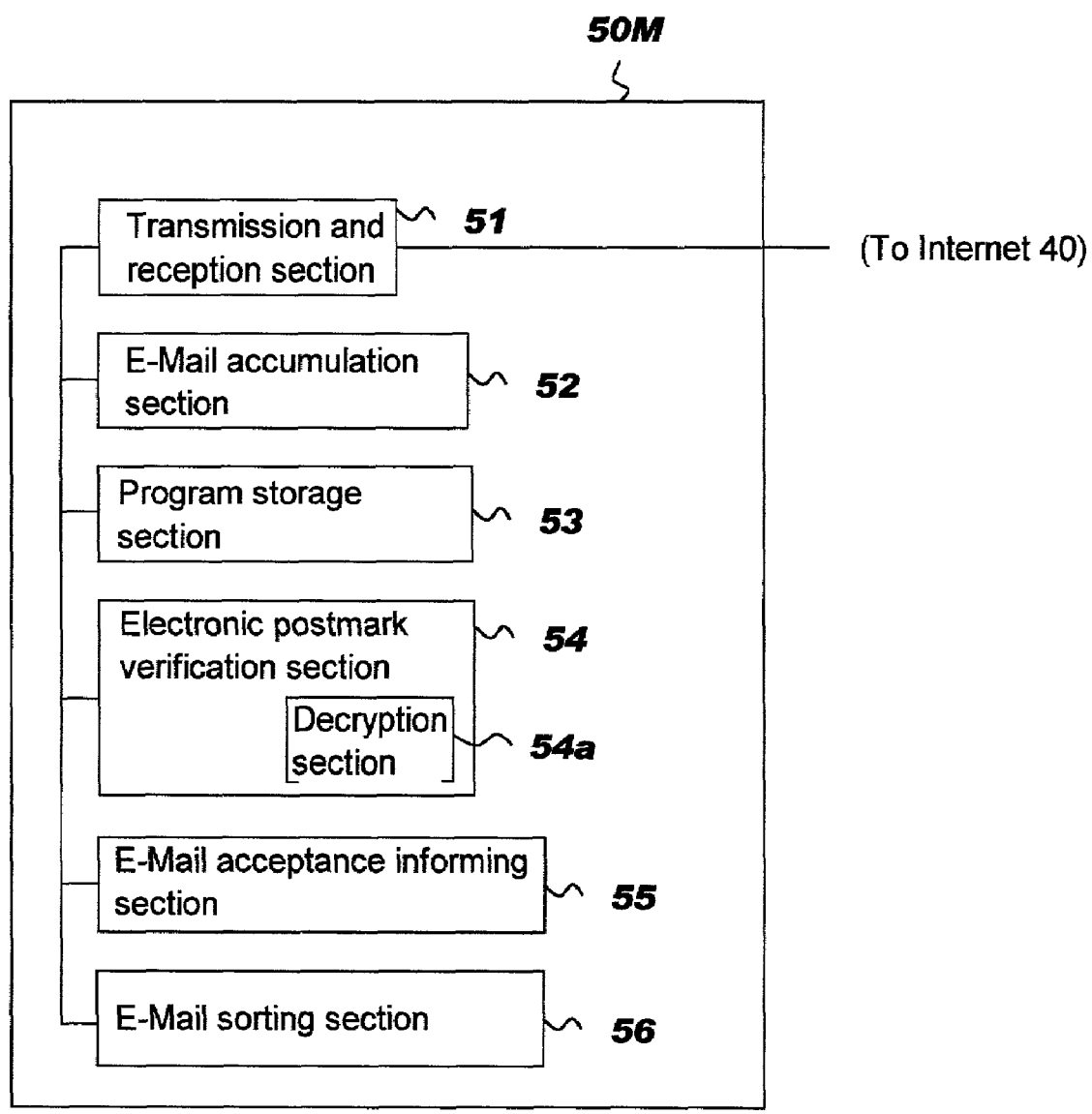
FIG. 5 shows a configuration of a receiver mail server.

As shown in FIG. 5, similar to common mail servers, the receiver mail server 50M comprises: a transmission and reception section (data receiving means) 51 for external data communication; and an e-mail storage section 52 for storing e-mail being transmitted or received.

The receiver mail server 50M also comprises: a program storage section 53 for storing predetermined receiver programs; an electronic postmark verification section (sending time information obtaining means) 54 for executing each of predetermined processes based on the receiver programs; an e-mail acceptance informing section 55; and an e-mail sorting section (data sorting means) 56.

The electronic postmark verification section 54 comprises a decryption section 54a for decrypting the e-mail data (including the electronic postmark) or the electronic postmark data received in an encrypted form with the public key provided in advance. Further, the electronic postmark verification section 54 analyzes the information in the decrypted electronic postmark and verifies whether it was issued by the authorized authorization mail server 20M or not. Here, the electronic postmark verification section 54 can verify the electronic postmark based on the information included in the electronic postmark data transferred, such as the name of the licensed ISP that stamped the electronic postmark, the location of the authorization mail server 20M, the IP address of the licensed ISP of the authorization mail server 20M. Moreover, once the electronic postmark verification section 54 succeeds in using the public key to decrypt the electronic postmark data encrypted by the authorization mail server 20M with the private key, it is further proved that the electronic postmark was issued by the authorized authorization mail server 20M.

The e-mail acceptance informing section 55 automatically informs the e-mail sender's PC 30, the authorization mail server 20M that has sent the e-mail, or the ISP's server 20S, of the acceptance of the e-mail. Here, if the authorization mail server 20M accumulates the e-mail reception information, it can provide a service similar to the delivery record or the like in postal services.

The e-mail sorting section 56 sorts (classifies or reorders) the received e-mail based on the information embedded in the electronic postmarks. Based on the highly accurate time information, GMT, which is embedded in the electronic postmarks, it reorders the received e-mail in the order of the attached time (time stamp) or classifies them, for example. Accordingly, in the case where a deadline is set in advance for example, it is also possible to determine whether the received e-mail meets the deadline or not, based on GMT embedded in the electronic postmarks.

Now, a method for transmitting and receiving the e-mail with the highly accurate time information embedded in it in the above-described e-mail transmission and reception system will be described with reference to FIG. 6 and 7.

Figure 6:
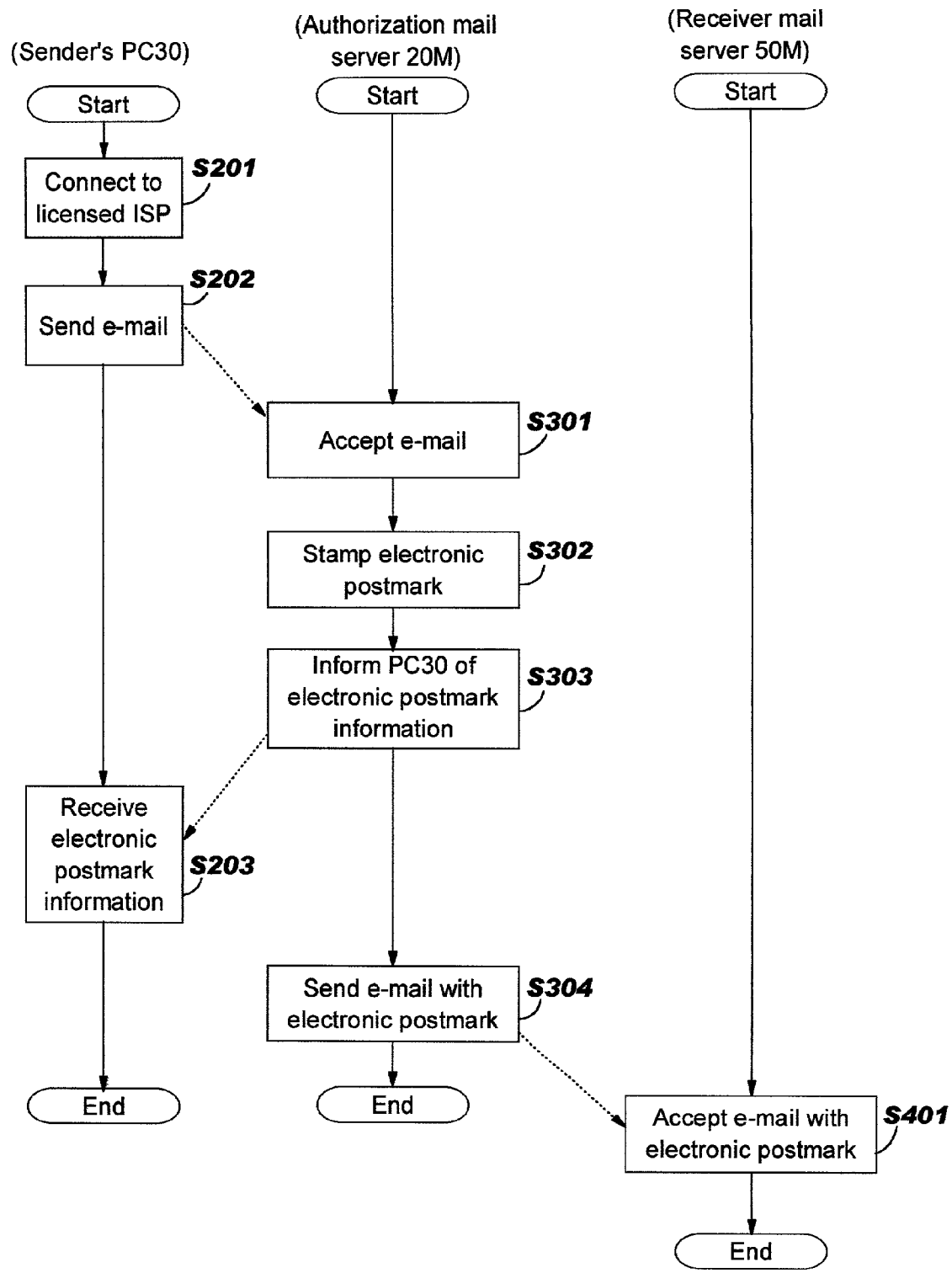
FIG. 6 is a flow chart showing processes for sending e-mail stamped with an electronic postmark.
Figure 7:
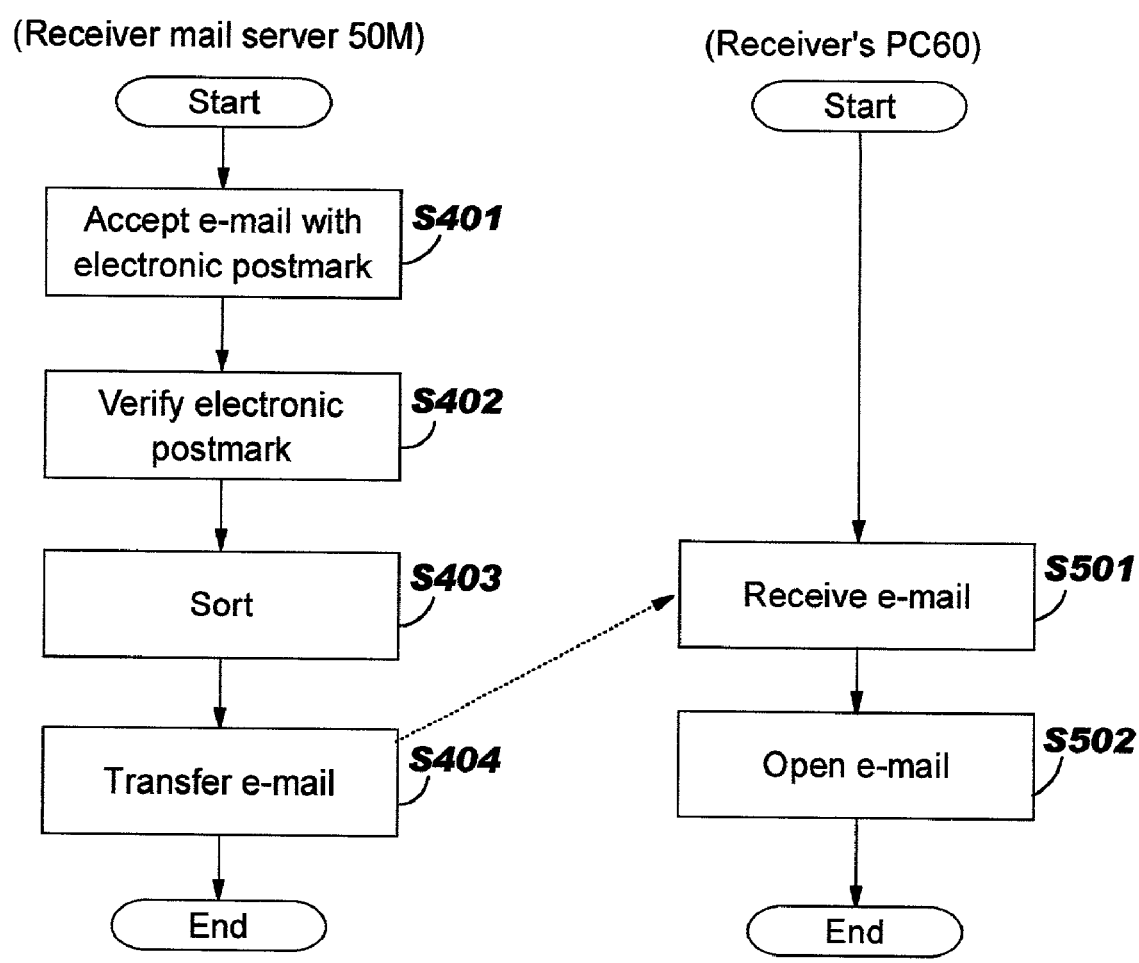
FIG. 7 is a flow chart showing a process flow on the receiver side of the e-mail.

FIG. 6 is a flow chart showing e-mail transmission processes. As shown in this figure, in order to send e-mail, the sender first establishes connection with the licensed ISP's server 20S by logging in to it on the sender's PC 30 via a public telephone line or other routes (step S201). Then, the sender sends data on e-mail composed on the sender's PC 30 (step S202: <2> in FIG. 1).

Then, the e-mail data is transferred to the authorization mail server 20M via the licensed ISP's server 20S with which the sender's PC 30 is registered (<3> in FIG. 1). The authorization mail server 20M determines whether the sender of the e-mail transferred to itself is registered as a user of the authorization mail server 20M or not. When the registration is confirmed, the e-mail data is accepted and accumulated in the e-mail accumulation section 22 (step S301).

Next, the electronic postmark stamping section 28 in the authorization mail server 20M attaches the electronic postmark data including the highly accurate time information to the e-mail data accumulated in the e-mail accumulation section 22. At this time, the highly accurate time information, GMT, obtained by the GMT obtaining section 24 from the radio wave clock section 26, or the local time based on GMT, is embedded by the electronic postmark stamping section 28 into the electronic postmark to be stamped on the e-mail (step S302). Further, the encryption section 28a in the electronic postmark stamping section 28 encrypts the data on the electronic postmark stamped on the e-mail data, or the e-mail data stamped with the electronic postmark, with the predetermined private key.

Further, the time-stamped e-mail status informing section 29 in the authorization mail server 20M informs the sender's PC 30, via the licensed ISP's server 20S, of the time information that has been embedded into the electronic postmark stamped on the e-mail, such as the time at which the authorization mail server 20M sent out the e-mail and other information (step S303: <4>, <5> in FIG. 1).

By receiving this information, the sender's PC 30 obtains the information on the electronic postmark attached to the e-mail, which is the time information representing the sending time for the e-mail (step S203).

On the other hand, the authorization mail server 20M sends out the e-mail data with the electronic postmark data to the Internet 40 via the licensed ISP's server 20S from the transmission and reception section 21 (step S304: <6> in FIG. 1). Then, the e-mail data is transferred to the receiver mail server 50M via the receiver ISP's server 50S based on the IP address specified as the destination (<7> in FIG. 1).

When the receiver mail server 50M receives the e-mail data transferred from the authorization mail server 20M, it accepts the e-mail and accumulates it in the e-mail accumulation section 52 (step S401). The e-mail from the sender's PC 30 is thus delivered to the receiver mail server 50M. In this manner, the receiver mail server 50M accepts the e-mail as it is, at which time it does not necessarily verify the time information or other information. This is because the sending time information resulting from the highly accurate time information is embedded in the electronic postmark stamped on the received e-mail, and the receiver mail server 50M can use the sending time attached by the authorization mail server 20M to the e-mail as the accepting time for the e-mail.

Now, the process flow in the mail server 50M for the receiver of the e-mail is described with reference to FIG. 7.

At step S401, immediately after the receiver mail server 50M accepts the e-mail, the e-mail acceptance information section 55 automatically informs the e-mail sender's PC 30, the authorization mail server 20M that has sent the e-mail, or the licensed ISP's server 20S, that the receiver mail server 50M has accepted the e-mail.

Then, with appropriate timings, the e-mail data accumulated in the e-mail accumulation section 52 is retrieved, and the electronic postmark data attached to the e-mail data is decrypted in the decryption section 54*a* of the electronic postmark verification section 54. Then, the electronic postmark verification section 54 verifies the information included in the decrypted electronic postmarks to determine whether the electronic postmarks have been stamped by the authorized authorization mail server 20M or not (step S402).

Then, the e-mail with the electronic postmarks determined to have been stamped by the authorization mail server 20M as a result of the verification is sorted (classified or reordered) by the e-mail sorting section 56 based on the highly accurate time information included in the electronic postmarks (GMT or a local time based on GMT) (step S403). Here, in the case of general e-mail, the e-mail data is reordered based on the order of the date of the electronic postmarks. In addition, if the receiver mail server 50M is accepting e-mail such as registrations to win a prize, the e-mail received from registrants (senders) can be sorted in the order in which the e-mail messages were sent or with regards to whether the sending dates meet the deadline or not, based on the highly accurate time information obtained from the electronic postmarks stamped on the e-mail.

Then, the e-mail data sorted in the receiver mail server 50M is transferred to the receiver's PC 60 that is the destination of the e-mail from the receiver mail server 50M via the receiver ISP's server 50S (step S404: <8>, <9> in FIG. 1). In the case of registration to win a prize, the receiver's PC 60 accepts the registrations and determines whether they meet the deadline or not based on the sorting result obtained in the receiver mail server 50M. In this case, it is also possible to transfer to the receiver's PC 60 only the e-mail determined to meet the deadline in sorting in the receiver mail server 50M.

Figure 8:
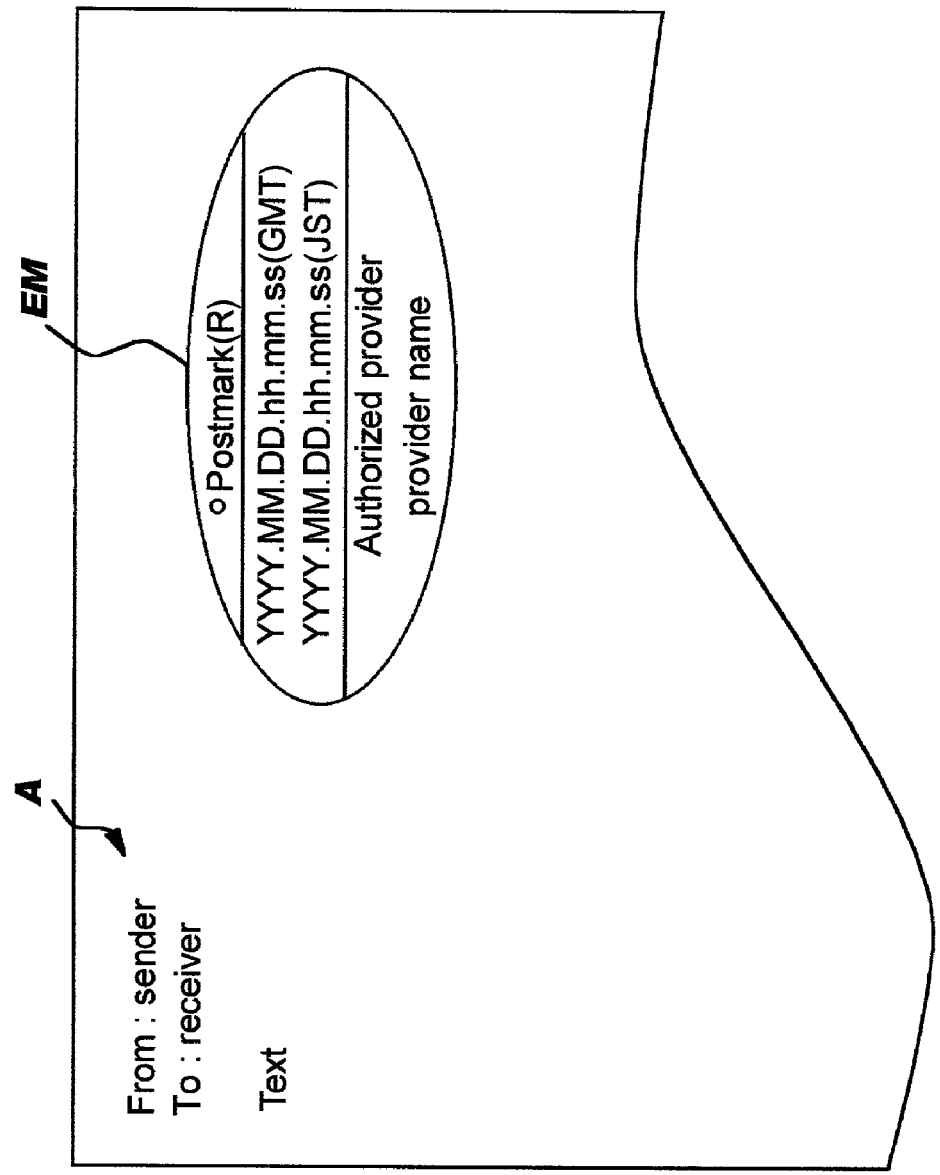
FIG. 8 shows an example of the electronic postmark displayed on an e-mail display screen.

Afterward, the receiver's PC 60 receives the e-mail (step S501) and opens it (step S502). Then, as shown in FIG. 8, the electronic postmark (the time stamp) EM including the highly accurate time information is displayed on an e-mail display screen A based on the rendering data included in the electronic postmark. The same goes for printing out the e-mail. As shown in this figure, the electronic postmark EM is displayed at a particular position on the e-mail display screen A based on the electronic postmark issue program. In the electronic postmark EM practically displayed like this are displayed the highly accurate time information "GMT" and/or "JST," the name of the licensed ISP (Authorized Provider) which stamped the electronic postmark EM, and so on.

It is further possible to have a viewer (a window) configured to pop up on the e-mail display screen A when a pointer such as a mouse pointer is put on the electronic postmark EM, in which information other than the information displayed as the electronic postmark EM are displayed within the viewer, for example the address of the authorization mail server 20M, the IP address of the authorization mail server 20M, and so on.

Thus, the receiver can visually know the sending time for the e-mail and other information from the information described in the electronic postmark EM.

As described above, because the authorization mail server 20M for the sender of e-mail stamps the electronic postmark with the highly accurate time information embedded into it on the e-mail being sent from the sender, the receiver of the e-mail can obtain the accurate sending time for the e-mail. Accordingly, it is possible to utilize the accurate time information for registration to win a prize as well as for regular e-mail, and various kinds of inconvenience on the Internet are eliminated.

Further, because the authorizing office 10 is adapted to authorize the authorization mail server 20M to issue the electronic postmarks with the highly accurate time information, the time information included in the electronic postmarks is guaranteed as accurate. Moreover, the load on the authorizing office 10 can be reduced, compared with the case where the authorizing office 10 itself provides the highly accurate time information or stamps the electronic postmarks with the highly accurate time information on the e-mail. Further, in practice, the configuration of this embodiment can be realized simply if a conventional ISP is authorized by the authorizing office 10. In addition, a user can readily receive the services of the above embodiment without the need of maintaining the highly accurate time information in the sender's (user's) PC 30 but only with registration with the licensed ISP that owns the authorization mail server 20M.

Moreover, the data on the electronic postmarks to which the highly accurate time information is attached in the authorization mail server 20M is made tamperproof by the predetermined electronic postmark issue program, and is further encrypted to be transferred to the receiver mail server 50M. This realizes high validity of the electronic postmarks (high reliability of the information).

Here, because the authorization mail server 20M encrypts the electronic postmark data with the private key, the receiver mail server 50M can verify the electronic postmark based on whether the electronic postmark data can be decrypted with the public key or not. That is, as far as the electronic postmark data can be decrypted, the electronic postmark can be regarded as having been stamped in the authorization mail server 20M, and moreover, the time information included in it can be trusted to be highly accurate.

Further, the receiver mail server 50M is adapted to accept e-mail and accumulate it in the e-mail accumulation section 52 on reception of the e-mail data transferred from the authorization mail server 20M. In this manner, the receiver mail server 50M can prevent its processing from being slowed and realize fast processing even when it is flooded by e-mail messages, by checking information such as the time information with appropriate timings after reception of the e-mail messages rather than on reception of them. This is realized because the sending time information resulting from the highly accurate time information is included in the electronic postmarks stamped on the e-mail, and the sending time information is adopted as the receiving time for the e-mail in the receiver mail server 50M.

In addition, as shown in FIG. 8, the electronic postmark EM appears on the e-mail display screen A or on a paper on which e-mail message is printed out, just like a postmark in regular postal services. Therefore, with a glance at the e-mail, the receiver of the e-mail can know the accurate sending time for the authorized e-mail.

Although the above embodiment is described with the example of stamping the electronic postmarks on e-mail, similar configurations can be also applied to other cases, for example where a user enters predetermined items in an order form that is made public on a website and sends the form to the webmaster. In this case, the authorizing office 10 authorizes the licensed ISP's server 20S rather than the authorization mail server 20M (<1>' in FIG. 1). After the user sends the data on the items entered on the order form to the licensed ISP's server 20S, the licensed ISP's server 20S attaches the electronic postmark to the data and sends it to the webmaster's ISP.

Further, in the case where the authorizing office 10 authorizes the licensed ISP's server 20S and a user opens a website on the licensed ISP's server 20S, the opening time for the website can be made reliable by the licensed ISP's server 20S attaching the highly accurate time information to the website data.

In the above embodiment, the authorization mail server 20M is adapted to attach the time information to e-mail being sent from the sender's PC 30. However, the present invention is not limited to this. For example, it is also possible that the sender obtains the highly accurate time information at the sender's PC 30 from the authorization mail server 20M when sending data such as e-mail and sends it with the time information. It is also possible that the sender's PC 30 obtains the time information from the authorization mail server 20M when accessing the authorization mail server 20M and uses the time information as the electronic postmark. Further, it is also possible to have the radio wave clock or other items at the sender's PC 30 rather than at the authorization mail server 20M and outputs e-mail with the highly accurate time information attached on the sender's PC 30. However, this creates a financial burden for equipping the sender's PC 30 with the radio wave clock.

In addition, the authorization mail server 20M does not necessarily need to obtain the time information from the radio wave clock section 26. For example, it can also use other time information such as a time signal. It can also receive the time information directly from the authorizing office server 11. However, this case involves data delay because the time information will be transferred as data.

Further, if there are several authorization mail servers 20M, the highly accurate time information maintained in the authorization mail servers 20M need not to be all identical. In such a case, the accuracy of time for each authorization mail server 20M may be classified so that one of the authorization mail sever 20M may be selected depending on an application.

Further, a program for executing the processes of obtaining the highly accurate time information in the authorization mail server 20M from the outside and sending out the data such as e-mail with attaching the electronic postmark data including the time information to it, and a program for executing the predetermined sorting process based on the highly accurate time information attached to the data on reception of the data with the time information in the receiver mail server 50M, as indicated in the above embodiment, may take the form of a storage medium or a program transmission device as follows.

The storage medium may be a storage device such as a CD-ROM, a DVD, memory, or a hard disk, in which the above-mentioned programs to be executed by a computer device are stored such that they are readable by the computer device.

The program transmission device may be configured to include the storage device such as a CD-ROM, a DVD, memory, or a hard disk, in which the above mentioned programs are stored, and transmission means for reading out the programs from the storage medium and transmitting the programs to the device for executing the programs via a connector or a network such as the Internet or a LAN. Such a program transmission device is suitable for installing the programs for executing the above-mentioned processes into the authorization mail server 20M or the receiver mail server 50M.

Further, it is possible to select some of the configurations referred in the above embodiment or appropriately change the configurations, without departing from the spirit of the present invention.

We claim:

1. A data transmission and reception system for sending and receiving data between a sender and a receiver via a network, comprising:

an authorizing server maintaining time information and authorizing a sender server after subjecting the sender server to examination and after the sender server is licensed by the authorizing server to issue electronic postmarks;

the sender server being connected to a network to send data via the network, wherein the sender server is authorized by the authorizing server to issue the electronic postmarks; and a receiver server connected to the network to receive the data from the sender server via the network;

wherein the sender server issues the time information and attaches the time information to the data to be sent from the sender server, and wherein the received data with the attached time information comprises an email message with an embedded electronic postmark that includes the time information representing a time immediately before the email was sent by the sender server, whereby the time that the email was sent by the sender server is after the email was sent to the sender server by a sender's PC.

2. A data transmission and reception system for sending and receiving data between a sender and a receiver via a network, comprising:

an authorizing server maintaining time information and authorizing a sender server after subjecting the sender server to examination and after the sender server is licensed by the authorizing server to issue electronic postmarks;

the sender server being connected to a network to send data via the network, wherein the sender server is authorized by the authorizing server to issue the electronic postmarks; and a receiver server connected to the network to receive the data from the sender server via the network;

wherein the sender server issues the time information and attaches the time information to the data to be sent from the sender server, and wherein the received data with the attached time information comprises an email message comprising an embedded electronic postmark that includes the time information representing a time immediately before the email was sent by the sender server.

3. The system according to claim 2, wherein the electronic postmark and the time information is displayed on an email display screen based on rendering data included in the electronic postmark.

4. A data transmission and reception system for sending and receiving data between a sender and a receiver via a network, comprising:

an authorizing server maintaining time information and authorizing a sender server after subjecting the sender server to examination and after the sender server is licensed by the authorizing server to issue electronic postmarks;

the sender server being connected to a network to send data via the network, wherein the sender server is authorized by the authorizing server to issue the electronic postmarks; and a receiver server connected to the network to receive the data from the sender server via the network;

wherein the sender server issues the time information and attaches the time information to the data to be sent from the sender server, and wherein the received data with the attached time information comprises:

an email message having an embedded tamperproof electronic postmark; and the time information being embedded into the embedded tamperproof electronic postmark and representing a time immediately before the email was sent by the sender server.

5. An electronic mail distribution system for receiving electronic mail data sent from a sender system and for sending the electronic mail data to a receiver system over a network, comprising:

an arrangement for maintaining time information having a certain accuracy;

the arrangement for maintaining the time information authorizing and monitoring a sender server to ensure, after subjecting the sender server to examination, that the sender server issues accurate time stamps;

the sender server comprising time stamp attaching means for attaching a time stamp including the time information maintained in the arrangement for maintaining the time information to electronic mail data received from a sender system; and data transmitting means for sending the electronic mail data with the time stamp to a receiver system, wherein the sent electronic mail data with the time stamp comprises:

an email message having an embedded tamperproof electronic postmark; and the time information being embedded into the embedded tamperproof electronic postmark and representing a time immediately before the email was sent by the sender server.

6. A data transmission method for sending out data received from a user's terminal to a network, comprising the steps of:

maintaining accurate time information with an authorizing office server;

authorizing a sender server to issue the accurate time information after the sender server has been authorized by the authorizing office server;

issuing, with the sender server, an electronic postmark including the accurate time information after the authorizing office server sends an electronic postmark issue program to the sender server;

attaching the electronic postmark to data received from a user's terminal;

sending out the data with the electronic postmark to a network, and wherein the sent data with the electronic postmark comprises:

an email message having an embedded tamperproof electronic postmark; and the accurate time information being embedded into the embedded tamperproof electronic postmark and representing a time immediately before the email was sent by the sender server.

\* \* \* \* \*